United States Patent [19]
Daly et al.

[11] Patent Number: 5,563,200
[45] Date of Patent: Oct. 8, 1996

[54] COATING POWDERS FOR PRODUCING HEAT-RESISTANT COATINGS

[75] Inventors: Andrew T. Daly, Sinking Spring; Leo T. Grundowski, Reading, both of Pa.

[73] Assignee: Morton International, Inc., Chicago, Ill.

[21] Appl. No.: 531,745

[22] Filed: Sep. 21, 1995

[51] Int. Cl.$^6$ .............................. C08K 3/30; C08F 20/00
[52] U.S. Cl. ..................... 524/423; 524/425; 524/444; 524/449; 524/450; 524/588; 524/604; 524/904; 525/446
[58] Field of Search ................... 524/425, 423, 524/449, 588, 904, 604, 444, 450; 525/446

[56] References Cited

U.S. PATENT DOCUMENTS

| | | | |
|---|---|---|---|
| 3,170,890 | 2/1965 | Boyd et al. | 260/37 |
| 3,585,065 | 6/1971 | Johnson | 117/93.31 |
| 4,107,148 | 8/1978 | Fujiyoshi et al. | 528/273 |
| 4,608,421 | 8/1986 | Lin | 525/446 |
| 4,879,344 | 11/1989 | Woo et al. | 525/100 |
| 5,066,720 | 11/1991 | Ohsugi et al. | 525/446 |
| 5,082,891 | 1/1992 | Morita et al. | 525/446 |
| 5,227,435 | 7/1993 | Kang et al. | 525/446 |
| 5,391,594 | 2/1995 | Romenesko et al. | 525/446 |
| 5,422,396 | 6/1995 | Daly et al. | 525/106 |

FOREIGN PATENT DOCUMENTS 2-206668  8/1990  Japan.

OTHER PUBLICATIONS

Brown, Lawrence H. "Silicones In Protective Coatings," in *Treatise on Coatings,* vol. 1, Part III, Film–Forming Compositions, pp. 513–563, 1972. (no mo.).

Wacker Silicone, Silicon–Intermediate Silicone Silicone Intermediate SY–430, one page. (no mo/y).

*Primary Examiner*—Mark D. Sweet
*Attorney, Agent, or Firm*—Wayne E. Nacker; Gerald K. White

[57] ABSTRACT

A coating powder composition for providing a smooth, heat-resistant coating contains A) between about 60 and about 95 parts by weight or a polyester resin which has either hydroxyl functionality of 2 or greater or carboxylic acid functionality of 2 or greater, B) between about 5 and about 40 parts by weight of a curative for the polyester resin A), A) and B), in total, being 100 parts resin, C) between about 50 and about 150 parts per hundred resin by weight (phr) silicone resin, D) between about 20 and about 100 phr of a filler selected from calcium silicate, silica, magnesium aluminum silicate, calcium carbonate, barium sulfate, and mixtures thereof, E) between about 1 and about 10 phr silicone rubber, and F), up to about 50 phr mica.

9 Claims, No Drawings

COATING POWDERS FOR PRODUCING HEAT-RESISTANT COATINGS

The present invention is directed to coating powders for producing heat-resistant coatings, particularly to polyester-based coating powders containing silicone resins.

BACKGROUND OF THE INVENTION

The present invention is directed to coating powders for producing coatings that must withstand very high temperatures, such as on barbecue grills or automotive exhaust systems. A coating for a barbecue grill for instance, may be required to withstand temperatures up to 800° F. (427° C.). To obtain a coating which will withstand such high temperatures, it is known to include silicone in the resin. An example of a silicone-containing coating powder, in this case acrylic-based, is found in U.S. Pat. No. 5,422,396, the teachings of which are incorporated herein by reference.

In addition to silicone resin, it is known to incorporate mica as a filler in coating powders, including both acrylic-based coating powders and polyester-based coating powders, to enhance heat-resistance of the coating that is produced.

Polyester-based coating powders containing both silicone resin and mica have been produced that exhibit excellent heat resistance. However, the coatings thereby produced tend to be rough to the touch and tend to mar easily. This phenomena is attributed to high oil absorption of mica.

In order to obtain smoother finishes, it has been attempted to replace or partially replace mica with other fillers, such as wollastonite ($CaSiO_3$). While a smoother coating initially results, the coating has less heat-resistance, tending to crack at high temperatures. It is a general object of the invention, therefore, to produce coating that is both smooth and highly heat-resistant.

SUMMARY OF THE INVENTION

In accordance with the present invention, there is provided a coating powder composition comprising A) between about 60 and about 95 parts by weight of a polyester resin which has either hydroxyl functionality of 2 or greater or carboxylic acid functionality of 2 or greater, B) between about 5 and about 40 parts by weight of a curative for the polyester resin A), A) and B), in total, being 100 parts resin, C) between about 50 and about 150 parts per hundred resin by weight (phr) silicone resin, D) between about 20 and about 100 phr of a filler selected from calcium silicate, silica, magnesium aluminum silicate, calcium carbonate, barium sulfate and mixtures thereof, E) between about 1 and about 10 phr silicone rubber, and F), up to about 50 phr mica.

DETAILED DESCRIPTION OF CERTAIN PREFERRED EMBODIMENTS

Herein, unless otherwise noted, the polyester resin A) plus the cross-linking agent or curative B) for the polyester resin are together calculated as 100 parts. Other components are given in parts per hundred resin by weight (phr) based on total of A) plus B). The invention is generally directed to polyester-based coating powders, including those based on hydroxyl-functional polyesters and those based on carboxylic acid-functional polyesters.

Polyesters are formed in conventional manner from carboxylic acids (or their anhydrides) having acid functionalities of 2 or greater and polyols having hydroxyl functionalities of 2 or greater. Examples of suitable multi-functional carboxylic acids include benzene-1,2,4-tricarboxylic acid, phthalic acid, tetrahydraphthalic acid, hexahydrophthalic acid, endobicyclo-2,2,1-5-heptyne-2,3-dicarboxylic acid, tetrachlorophthalic acid, cyclohexanedioic acid, succinic acid, isophthalic acid, terephthalic acid, azelaic acid, maleic acid, trimesic acid, 3,6-dichlorophthalic acid, tetrachlorophthalic acid, adipic acid, sebacic acid, and like carboxylic acids, Examples of suitable multi-functional alcohols include glycerin, trimethylolpropane, trimethylolethane, trishydroxyethylisocyanurate, pentaerythritol, ethylene glycol, diethylene glycol, propylene glycol, trimethylene glycol, 1,3-, 1,2- and 1,4-butanediols, heptanediol, hexanediol, octanediol, 2,2'-bis (4-cyclohexanol) propane, neopentyl glycol, 2,2,3-trimethylpentane-1,3-diol, 1,4-dimethylolcyclohexane, 2,2,4-trimethylpentane diol, etc.

Whether the polyester is substantially carboxylic acid functional having —COOH moieties, or hydroxyl functional having —OH groups, depends upon the —COOH/—OH molar ratio of the monomer mix. Hydroxyl functional polyesters useful in the invention have hydroxy equivalent weights between about 200 and about 2000. Carboxylic acid functional polyesters useful in the invention have acid numbers of between about 1000 and about 2000. Polyesters useful in the invention may be substantially straight chain having either hydroxyl or carboxylic acid functional of 2 or may be branched having hydroxyl or carboxylic acid functionality of up to about 3.5. In some cases, mixtures of polyesters having different functionalities may be used. For coating powders, the polyester resin used should have a glass transition temperature ($T_g$) of at least about 320° F. (160° C.).

The cross-linking agent or curative B) used in conjunction with the polyester A) depends upon whether the polyester is substantially carboxylic acid functional or substantially hydroxyl functional. For carboxylic acid functional polyesters, preferred curatives are multi-functional epoxies, triglycidal isocyanurate (TGIC) being a particularly preferred curative. For hydroxyl functional polyesters, a suitable curative is an aminoplast, such as hexa(methoxymethyl) melamine (HMMM) or a multi-functional isocyanate, particularly a blocked multi-functional isocyanate. The curative B) for cross-linking the polyester is typically provided close to the stoichiometric equivalence of the hydroxyl or carboxylic acid functionality of the polyester, although a slight stoichiometric excess or deficit of curative B) may be employed. Thus B) may be provided at a stoichiometry of between about 0.7 and about 1.3 relative to the reactive functional groups of the polyester resin.

Although the stoichiometry of the curative to the resin is the same whether the polyester resin is hydroxyl functional and thus cured with a hydroxy-reactive curative or is carboxyl functional and thus cured with a carboxy-reactive curative, the relative amounts of resin curative, in weight percent, tends do differ depending whether the system is a hydroxy-cured system or a carboxy-cured system. Typically, in hydroxy-cured systems, the resin A) comprises between about 60 and about 85 wt% of A) plus B), most typically between about 60 and about 80 wt% and the curative B) comprises between about 15 and about 40 wt%, most typically between about 20 and about 40 wt%. Typically, in carboxy-cured systems, the resin A) comprises between about 85 and about 95 wt% of A) plus B), most typically between about 90 and about 95 wt% and the curative B) comprises between about 5 and about 15 wt%, most typically between about 5 and about 10 wt%.

Suitable silicone resins C) for use in the invention are discussed in "Silicones in Protective Coatings" by Lawrence H. Brown in *Treatise on Coatings* Vol. 1, Part III "Film-Forming Compositions" PP. 513–563, R. R. Meyers and J. S. Long eds. Marcel Dekker, Inc. New York, 1972, the teachings of which are incorporated herein by reference. Suitable silicone resins are also described in U.S. Pat. Nos. 3,585,065, 4,107,148, 3,170,890 and 4,879,344, the teachings of each or which are incorporated herein by reference. The organic moieties of the silicone resins are aryl, particularly phenyl, or short chain ($C_1$–$C_4$) alkyl. For good heat resistance, methyl and phenyl groups are the organic moieties of choice. Generally, the more phenyl groups, the higher heat-resistance provided. For forming powder coatings, the silicone resins should be solid at room temperature and preferably have a $T_g$ of at least about 113° F. (45° C.). Examples of such silicone resins are phenylsilicone SY-430, sold by Wacker Silicone, Consohockon, Pa., having an average molecular wt. of about 1700, methylsilicone MK and methylphenylsilicone H-44 both also sold by Wacker and methylphenylsilicone 6-2230 sold by Dow Corning.

For high temperature stability, silicon resins useful in the invention have a degree of substitution as described in *Silicones in Protective Coatings*, supra of about 1.5 or less, typically between about 1.0 and about 1.1. Specifically, degree of substitution is defined as the average number of substituent groups per silicon atom and is the summation of the mole per cent multiplied by the number of substituents for each ingredient. Silicon resins are used which self-condense at high end-use temperatures, e.g., that of a barbecue grill or an automobile exhaust part. This requires siloxane functionality (Si-O-H), and silicone resins used herein have an —OH content of between about 2.5 and about 7.5 wt.% of the silicone resin.

Fillers D) useful in partial or complete replacement of mica for the purpose of producing a smoother coating are selected from the group consisting of calcium silicate, silica, magnesium aluminum silicate, calcium carbonate, barium sulfate and mixtures thereof.

In accordance with the invention, it is found that fillers D) may be used to provide a smooth finish that is resistant to very high temperatures if a small amount of silicone rubber E) is included in the formulation. While the silicone rubber has similarities to the silicone resin C above, it is distinguishable therefrom. Silicone rubbers are formed from straight-chain dialkylpolysiloxane chains, particularly straight-chain dimethylpolysiloxane chains which are cross-linked are cross-linked at their termini, e.g., with acetoxysilanes methyltris(isopropenoxy)silane, and amino-, amido- and ketoxy-silanes. Thus the chains used in forming the silicone rubber have a degree of substitution of 2. One particularly useful silicone rubber is a cured dimethylvinylsiloxy-end blocked dimethylpolysiloxane as described, for example, in U.S. Pat. No. 5,387,624, the teachings of which are incorporated herein by reference. Silicone rubber is not itself a heat stable product; thus, it is surprising that in relatively small amounts it improves heat stability of the coating of the present invention.

While a non-mica filler D) replaces at least some of the mica of prior art formulations, smooth finishes can still be achieved using mica levels up to about 40 phr, and somewhat less smooth finishes up to about 50 phr. Although no mica is necessary, mica F) at levels of 10 to 50 phr contribute to heat-stability.

The coating powder may optionally include a cure catalyst for the polyester, such as methyl triphenyl phosphonium bromide (MTPB), tetra n-butyl phosphonium bromide (TPB), dibutyltin oxide, p-toluene sulfonic acid and tetrabutyl titanate. Also, conventional minor components, such as flow control agents, may be added.

The coating powder may optionally contain a cure catalyst for the silicone resin, such as Zn acetylacetonate. Use levels for silicone cure catalyst is typically between about 0.1 and about 1 phr.

Coating powders in accordance with the present invention are formed in a conventional manner. The components of the coating powder are batched and shaken, e.g., for 5 minutes, to blend well. The materials are then extruded, e.g., at 220° F. (104° C.) in a Buss single screw extruder, allowed to cool, chipped, ground and screened to obtain a powder of appropriate size. Average particle size is typically 20–80 microns. Scalping at 100 mesh is typical to remove coarse particles. There is typically about 10% by weight of particles below 10 microns. The amount of material retained on a 325 mesh is typically between about 30 and 50 wt.%. The powder is then applied in a conventional manner, e.g., electrostatically, to a substrate. The substrate is heated at the time of application and/or subsequently so that the coating particles form a continuous film.

While the polyester is the primary binder for the coating which is initially applied and cured, the polyester cannot withstand extensive exposure to temperatures above about (204° C.) 400° F. It is believed that during extended exposure to temperatures above 400° F. (204° C.) the cured polyester burns away while the silicone resin self-cures to bind the high-temperature exposed coating.

The invention will now be described in greater detail by way of specific example.

EXAMPLE 1-3

Coating powder compositions were formulated as follows, compositions 1 and 3 being comparative, composition 2 being in accordance with the invention.

| Component | #1 | #2 | #3 |
|---|---|---|---|
| Morkot ® 98 (hydroxyl functional polyester) hydroxyl no. 30 | 42.3 | 42.3 | 42.3 |
| Cargil ® 3011 (hydroxyl functional polyester) hydroxyl no. 50 | 28.1 | 28.1 | 28.1 |
| B-1540 (Uretdione (isocyanate curing agent)) | 29.6 | 29.6 | 29.6 |
| Wacker ® H-44 methyl phenyl siloxane | 18.5 | 18.5 | 18.5 |
| Suzorite ® 325 (mica) | 37.0 | 37.0 | 49.3 |
| Nyad ® (Wollastonite) | 24.7 | 24.7 | |
| Pigments | 33.7 | 33.7 | 33.7 |
| P67 (flow aid) | 1.2 | 1.2 | 1.2 |
| Dow Corning Additive 22 (silicone rubber) | 0 | 3 | 0 |

The compositions were melt-blended at 220° F. (104° C.) and fragmented to produce coating powders. 3×6 aluminum Q panels were electostatically sprayed to 1.8–2.0 mils and cured at 450° F. for 15 minutes. Subsequently, the panels were heat aged at 67 hours at 800° F. Results are as follows:

| | #1 | #2 | #3 |
|---|---|---|---|
| Initial appearance | very smooth | smooth | slightly textured, rough |
| Heat Aging | Coating blistered and flaked | no flaking or blistering | no flaking or blistering |

What is claimed is:

1. A coating powder composition comprising

A) between about 60 and about 95 parts by weight of a polyester resin which has either hydroxyl functionality of 2 or greater or carboxylic acid functionality of 2 or greater, B) between about 5 and about 40 parts by weight of a curative for said polyester resin A), A) and B), in total, being 100 parts resin, C) between about 50 and about 150 parts per hundred resin by weight silicone resin having a degree of organic moiety. substitution of 1.5 or less, D) between about 20 and about 100 parts per hundred resin by weight of a filler selected from calcium silicate, silica, magnesium aluminum silicate, calcium carbonate, barium sulfate, and mixtures thereof, E) between about 1 and about 10 parts per hundred resin by weight silicone rubber, said silicone rubber being dialkylpolysiloxane chains that are cross-linked at their termini, and F), up to about 50 parts per hundred resin by weight mica.

2. A composition according to claim 1 containing between about 10 and about 50 parts per hundred resin by weight mica.

3. A composition according to claim 1 containing between about 10 and about 40 parts per hundred resin by weight mica.

4. A coating powder according to claim 1 wherein said polyester resin A) has a hydroxyl functionality of 2 or greater and said curative B) is hydroxy-reactive.

5. A coating powder according to claim 4 wherein said resin A) comprises between about 60 and about 85 wt% of A) plus B) and said hydroxy-reactive curative B) comprises between about 15 and about 40 wt% of A) plus B).

6. A coating powder according to claim 4 wherein said resin A) comprises between about 60 and about 80 wt% of A) plus B) and said hydroxy-reactive curative B) comprises between about 20 and about 40 wt% of A) plus B).

7. A coating powder according to claim 1 wherein said polyester resin A) has a carboxylic acid functionality of 2 or greater and said curative B) is carboxy-reactive.

8. A coating powder according to claim 7 wherein said resin A) comprises between about 85 and about 95 wt% of A) plus B) and said carboxy-reactive curative B) comprises between about 5 and about 15 wt% of A) plus B).

9. A coating powder according to claim 7 wherein said resin A) comprises between about 90 and about 95 wt% of A) plus B) and said hydroxy-reactive curative B) comprises between about 5 and about 10 wt% of A) plus B).

* * * * *